Nov. 22, 1927.

J. S. REID 1,649,860

SHOCK ABSORBER

Filed Nov. 19, 1925

2 Sheets-Sheet 1

Inventor
James S. Reid
By Brockett & Hyde
Attorneys

Nov. 22, 1927.  
J. S. REID  
1,649,860  
SHOCK ABSORBER  
Filed Nov. 19, 1925  
2 Sheets-Sheet 2

Inventor  
James S. Reid  
By Brockett & Hyde  
Attorneys

Patented Nov. 22, 1927.

1,649,860

UNITED STATES PATENT OFFICE.

JAMES S. REID, OF CLEVELAND, OHIO, ASSIGNOR TO THE NEWELL-THOMPSON COMPANY, OF CLEVELAND, OHIO, A CORPORATION OF OHIO.

SHOCK ABSORBER.

Application filed November 19, 1925. Serial No. 70,067.

This invention relates to shock absorbers for vehicles.

The object of the invention is to provide an improved shock absorber in which under normal running conditions on a fairly smooth road the main vehicle springs function with their usual effect in both directions of body movement, the shock absorbing or motion restraining parts having a more or less neutral or ineffective zone for such purpose, but in which excessive or unusual relative approach of body and axle is freely permitted while relative separation or, as it is sometimes termed, "rebound" is firmly and uniformly retarded not only until the parts return to said neutral zone, but even when such relative separation is continued beyond the neutral zone, all for the purpose of permitting the wheels to accommodate themselves to an uneven road bed without unduly transmitting shocks and jars to the body and without liability of breaking the springs, particularly by an otherwise severe rebound.

The invention is an improvement upon the shock absorber shown in my prior application for snubber, filed January 28, 1925, Ser. No. 5,266.

Figure 1:
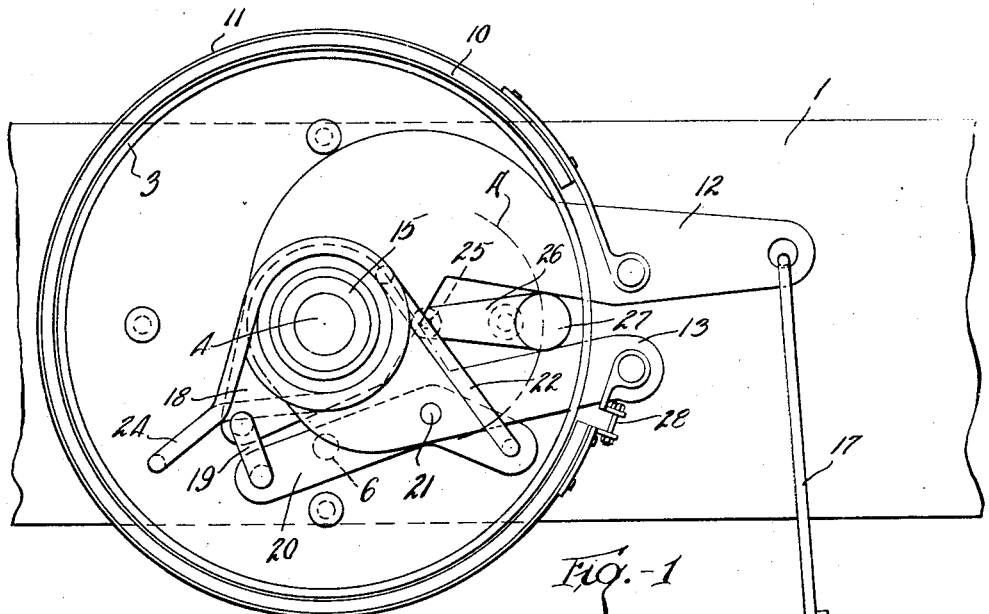
Figure 2:
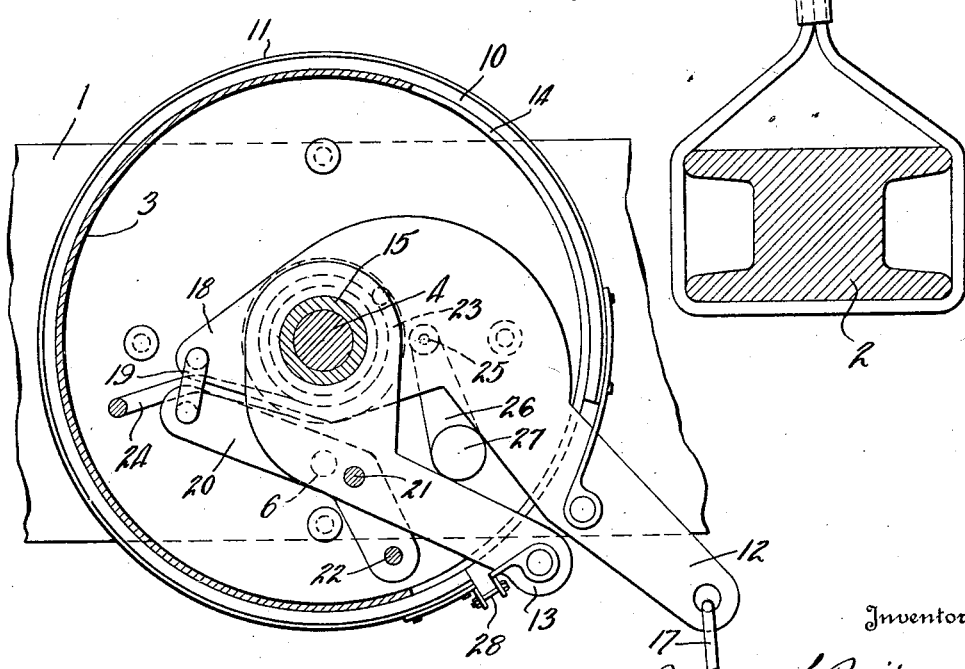
Figure 3:
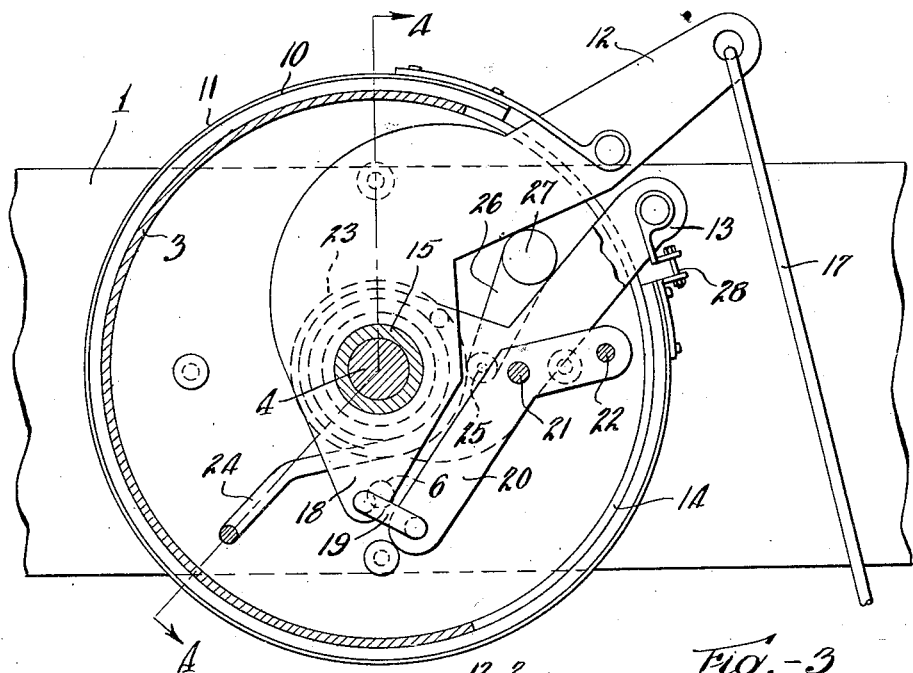
Figure 4:
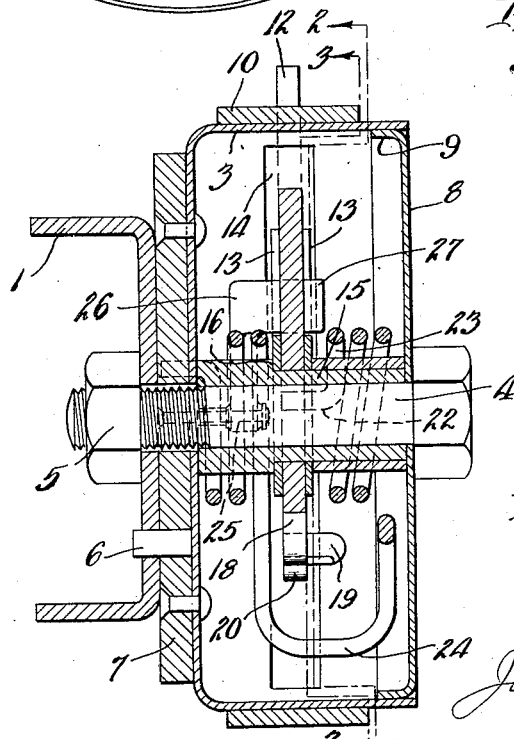

In the drawings Fig. 1 represents a front view of a shock absorber embodying the invention, the cover plate being omitted and the parts being shown in neutral position; Fig. 2 is a sectional elevation on the line 2—2, Fig. 4, showing the parts in spring expanded position; Fig. 3 is a sectional elevation on the line 3—3, Fig. 4, showing the parts in spring compressed position; and Fig. 4 is a section on approximately the line 4—4, Fig. 3.

In the drawings, 1 represents a vehicle body member supported on any of the usual forms of vehicle springs (not shown) which in turn are supported by the axle 2 or a corresponding member, or in other words, members 1 and 2 may be any of the usual vehicle members between which yielding or cushioned motion is permitted by connecting springs or the like for easy riding purposes and for convenience are here referred to as body and axle.

On one of them, such as the body member, is supported a relatively stationary part cooperating with a relatively movable part connected to the other or axle member so as to partake of all relative body and axle motion, said stationary and movable parts being so constructed and related as to at times freely permit their own relative motion and at other times to produce a retarding effect to restrain their relative motion and which effect is communicated to the body and axle and thus modifies or subdues their relative motion. For simplicity of illustration I have chosen to illustrate my invention in connection with a brake drum and band parts for such purposes, although other types of retarding devices may be used with like effect.

The brake drum 3 is a simple pressed metal cup suitably secured non-rotatably to the body, such as by the post or bolt 4 and nut 5, rotation being prevented by a pin 6 carried by the backing or base 7 to which the drum is riveted and which pin enters a hole in the body. Attachment is therefore simple, requiring the provision of but two holes in the vehicle frame. The cavity within the drum is closed by a cap or cover 8 held by the bolt in the position shown with its shallow flange 9 supporting and reinforcing the edge of the drum wall.

The brake band 10 comprises the usual strip of woven asbestos or composition brake band lining riveted or otherwise secured to a flexible, but strong metal band 11, the opposite ends of said brake band being secured to pins on two arms 12, 13, both extending outwardly through a circumferentially extending slot 14 in the drum wall and rotating around a bushing 15 on the central bolt. Preferably said bushing is shouldered, as at 16, to form a seat for one side of said arms while a spacing bushing is inserted on their other side, as shown in Fig. 4, to hold said arms in a middle position, the spacing bushing being short enough to permit them to rotate freely without binding.

The longer arm 12 is a single member connected by any suitable tie to the axle member, such as by the flexible cable or chain 17 which may be yieldingly extensible by a strong spring to a limited extent for protective purposes, but preferably is non-extensible. It is provided with a small elbow 18 connected by a U shaped short link 19 to one arm of a lever 20 pivoted at 21 between the two members of arm 13 which lie one on either side of arm 12. The other arm of said lever 20 is connected to the free end of a special spring 22. Said spring has two sets of coils 23 both surrounding the central post and lying one on each side of the middle plane, said two sets of coils being connected by a yoke 24 extending radially outwardly. The opposite end of the spring at the end of the inner set of coils has its end turned and entering an opening in the end drum wall and base 7. Said spring is inserted into position under initial tension with its outer or movable end where it is connected to lever 20 constantly tending to rotate all parts in the counterclockwise direction, Fig. 1.

In the back wall formed by the end drum wall and base 7 is riveted or otherwise firmly secured a pin or stub shaft 25 on which turns a short neutralizing lever 26 having a pin or arm 27 in the form of a roller journalled in the lever or, as shown, a short cylindrical member riveted therein. This arm lies in the space or recess between the two arms 12, 13 and during motion of said arms together around the central axis it travels with them. However, the path of movement of the arm 27 is around the center of pin 25, which is eccentric to the central bolt, said path being marked A, Fig. 1. Therefore, as the arms 12, 13 travel together around the central axis the arm 27 approaches and recedes from the central axis. This motion is taken advantage of to produce the neutral zone of negligible or minimum braking or retarding effect before referred to, the result being accomplished by the wedging or cam action of arm 27 between the inclined or non-radial neighboring edges of arms 12, 13, to more or less separate said arms and open or relieve the brake band from the drum or permit it to close and hug the same with a retarding effect. If desired the brake band mechanism may be adjustable in any usual manner to vary its effective length such as by a screw adjustment between one end of the brake band metal strap 11 and one of the arms 12 or 13, as indicated at 28.

Installation of a shock absorber upon a car is unusually simple. Having formed the holes for bolt 4 and pin 6 the parts are pushed in to the position shown in the drawings and after applying a nut and lock washer to the bolt the latter is screwed up with a socket wrench. The tie 17 attached to arm 12 is then pulled down and fastened to the axle member, its length being adjusted so that with the normally loaded car standing still the arms 12, 13 and other parts of the shock absorber will lie at about the center of the neutral zone or in the position shown in Fig. 1. In this position the neutralizing pin 27 is at its greatest distance from the central post and has moved outwardly between and has positively separated the arms 12, 13 so that the brake band is expanded and released.

The operation is as follows:

Spring 22 has one end fastened to a stationary part and its opposite end connected to lever 20, which is pivoted on arm 13 and linked to arm 12. Said spring therefore always has a tendency to turn both arms and the brake band in the counterclockwise direction, Fig. 1. It is obvious that when the wheels run into a depression the car body will move downwardly toward the axles and compress the main vehicle springs and upon rebound will move upwardly and expand the main springs. When the car body moves downwardly toward the axle the effect of spring 22 is to move all parts toward the position shown in Fig. 3, and when the car body moves upwardly or away from the axle, the pull on the tie 17 acting against spring 22 and the frictional retarding effect on the drum is to move all parts toward the position shown in Fig. 2. However, as stated, in the neutral position, Fig. 1, the neutralizing pin 27 has fully released the brake and as the arms 12, 13 move back and forth on either side of this neutral position they will cause corresponding motion of neutralizing pin 27, but without material approach of said pin toward the central axis during the first few degrees of motion on either side of the center. Of course, the greater the motion is of the arms 12, 13 away from the midpoint of the neutral zone, the more rapidly does neutralizing pin 27 approach the central axis and the more rapidly does it permit the arms 12, 13 to approach each other and apply the brake. Usually the parts are so adjusted that the neutralizing pin 27 can have about a half inch or so of movement on either side of the midpoint without appreciable application of braking effect, the neutral zone thus produced enabling the parts of the shock absorber to move back and forth, first in one direction and then in the other, with the ordinary flexing of the main vehicle springs encountered on the average smooth roadway.

Let us assume now that the vehicle wheels drop into a fairly deep depression, the vehicle body following the axle and by its momentum compressing the main vehicle springs to a maximum, permitting all parts to move to the position shown in Fig. 3. The parts reach this position promptly and without retarding effect of the brake band upon the drum, due to the fact that as the body moves downwardly the pull on the tie 17 is first slackened and the effect of spring 22 applied through the lever 20 to arm 12 is to keep the arm 12 advanced ahead of arm 13 and thereby keep the brake released until all parts have moved as far as possible under the main spring compression. However, as soon as the body starts to rise away from the axle a sudden pull is applied to the tie 17, tending to move arm 12 clockwise, while spring 22 continues to tend to move arm 13 counterclockwise. The brake is therefore wrapped tightly about the drum and a frictional retarding effect is produced, restraining motion of the parts toward the neutral zone. The greater the pull upon the tie 17 the greater is this retarding effect and the net result is the compulsion of the vehicle body to gradually move upward on the rebound and not by a sudden movement tending not only to throw the occupants of the vehicle upwardly, but also to unduly expand and possibly break the main vehicle springs. The retarding effect of the brake band upon the drum does not increase as the parts move toward the neutral zone, unless perchance the pull upon the tie 17 is increased, and said retarding effect is not due directly to the effect of the spring 22, nor is it dependent upon the strength of the spring 22. Indeed, spring 22 only need be a fairly strong spring with power enough to quickly move the arms 12, 13 and other parts and apply to the drum that end of the band connected to arm 12, since the retarding effect is due to the pull on the tie 17 and is in proportion to the strength of said pull. As the body moves upwardly under the retarding effect the brake band, of course, slips around upon the drum until finally the neutral zone is reached where the neutralizing pin has been moved outwardly to a position where it wedges apart arms 12, 13 and releases the brake. Said neutralizing pin is positively moved by the arms 12, 13 and positively forces them apart. When the neutralizing zone, Fig. 1, has been reached the body and axle are free to resume their former moderate movements if the car is travelling on a fairly even roadway.

Provision has also been made for abnormal instances in which regardless of the restraining effect tending to retard the return of the body upwardly to neutral position the body still has sufficient momentum to carry it upwardly beyond the neutral zone either on the rebound or where a depression is so exaggerated as to permit the wheels to rapidly drop away from the body before the latter has time to follow them. In such cases the parts move toward the position shown in Fig. 2. Again said motion is produced by the pull of the tie 17 effective upon arm 12. As soon as the neutralizing pin 27 has moved inwardly toward the central axis sufficiently to permit arms 12, 13 to approach each other sufficiently to apply the brake, the brake is applied by the pull on the tie 17 and further motion of the parts toward the position in Fig. 2 is restrained by a braking effect similar to that before described. Such braking effect is effective to prevent extreme separation of the body and axle on abnormal rebound, such separation as is practically always the actual cause of breakage of leaves of the main vehicle springs. After such an abnormal separation of body and axle, the pull on tie 17 is relaxed and the first effect of spring 22 is to advance the arm 12 upwardly, arm 13 being held by the pressure of its end of the brake band upon the drum. The initial effect of spring 22 is therefore always to first relax the brake by permitting counterclockwise motion of arm 12, following which main spring 22 moves both arms in the counterclockwise direction. This is a valuable function of spring 22, because it enables the brake to relieve itself in case it has been frozen fast by ice in the winter or in case it is stuck to the drum for any other reason when the car has been standing still for some time. Obviously, under such conditions, the first downward motion of the vehicle body permits arm 12 to be elevated by spring 22 and the brake band is stripped from the drum progressively from arm 12 toward arm 13 and does not have to be slid bodily around the drum and simultaneously broken away from it over the entire area.

In practice I find it desirable to so adjust or proportion the parts, such as by choice of the proper length of brake band, that after the high spots on the brake band have been worn down and it is acting uniformly over its entire area, a depression of the body toward the axle will be followed by retardation of body and axle separation which will permit the parts to not only move back to the neutral, but to even move slightly beyond the same and then go back to the neutral zone for continued easy riding effect. With such operation the effects upon occupants of the vehicle are minimized and the springs are fully protected. The snubbing action is not harsh nor is the action of the main vehicle springs unduly modified.

What I claim is:

1. A shock absorber for connection to vehicle body and axle members having both converging and diverging movement, comprising relatively movable parts for retarding diverging movement of said vehicle members, and means for rendering said parts effective to produce a retarding effect upon opposite sides of a zone in which said parts do not produce a retarding effect.

2. A shock absorber for connection to vehicle body and axle members having both converging and diverging movement, comprising relatively movable parts for retarding diverging movement of said vehicle members, and means for rendering said parts ineffective to produce a retarding effect in an intermediate zone, said parts being effective to produce a retarding effect upon opposite sides of said zone.

3. A shock absorber for connection to vehicle body and axle members having both converging and diverging movement, comprising relatively movable parts for retarding diverging movement of said vehicle members but having no retarding effect on converging movement thereof, and means for rendering said parts effective to produce a retarding effect upon opposite sides of a zone in which said parts do not produce a retarding effect.

4. A shock absorber for connection to vehicle body and axle members having both converging and diverging movement, comprising relatively movable parts for retarding diverging movement of said vehicle members but having no retarding effect on converging movement thereof, and means for rendering said parts ineffective to produce a retarding effect in an intermediate zone, said parts being effective to produce a retarding effect upon opposite sides of said zone.

5. A shock absorber for connection to vehicle body and axle members having both converging and diverging movement, comprising relatively movable parts for retarding diverging movement of said vehicle members, and rotatable means for rendering said parts ineffective to produce a retarding effect in an intermediate zone, said parts being effective to produce a retarding effect upon opposite sides of said zone.

6. A shock absorber for connection to vehicle body and axle members having both converging and diverging movement, comprising relatively movable brake drum and band parts for retarding diverging movement of said vehicle members, and means for rendering said drum and band parts ineffective to produce a retarding effect in an intermediate zone, said parts being effective to produce a retarding effect upon opposite sides of said zone.

7. A shock absorber for connection to vehicle body and axle members having both converging and diverging movement, comprising relatively movable parts capable when operated to retard diverging movement of said vehicle members, operating members for said retarding parts rotatably mounted upon the same axis, and means for rendering said operating members ineffective to operate said retarding parts to produce a retarding effect.

8. A shock absorber for connection to vehicle body and axle members having both converging and diverging movement, comprising relatively movable parts capable when operated to retard diverging movement of said vehicle members, operating members for said retarding parts rotatably mounted upon the same axis, means connecting said operating members, and means for rendering said operating members ineffective to operate said retarding parts to produce a retarding effect.

9. A shock absorber for connection to vehicle body and axle members having both converging and diverging movement, comprising relatively movable parts capable when operated to retard diverging movement of said vehicle members, operating members for said retarding parts rotatably mounted upon the same axis, and rotatable means for rendering said operating members ineffective to operate said retarding parts to produce a retarding effect.

10. A shock absorber for connection to vehicle body and axle members having both converging and diverging movement, comprising relatively movable parts capable when operated to retard diverging movement of said vehicle members, operating members for said retarding parts rotatably mounted upon the same axis, and means rotatable upon a different axis than the axis of said operating members for rendering said members ineffective to operate said retarding parts to produce a retarding effect.

11. A shock absorber for connection to vehicle body and axle members having both converging and diverging movement, comprising relatively movable parts capable when operated of retarding diverging movement of said vehicle members, means normally tending to operate said parts to produce a retarding effect, and means for rendering said parts ineffective to produce a retarding effect in an intermediate zone.

12. A shock absorber for connection to vehicle body and axle members having both converging and diverging movement, comprising relatively movable parts capable when operated of retarding diverging movement of said vehicle members, spring means normally tending to operate said parts to produce a retarding effect, and means for rendering said parts ineffective to produce a retarding effect in an intermediate zone.

13. A shock absorber for connection to vehicle body and axle members having both converging and diverging movement, comprising relatively movable parts capable when operated to retard diverging movement of said vehicle members, operating members for said retarding parts rotatably mounted upon the same axis, means for rendering said operating members ineffective to operate said retarding parts to produce a retarding effect in a predetermined zone, and yielding means normally tending to operate said members to cause said parts to produce a retarding effect.

14. A shock absorber for connection to vehicle body and axle members having both converging and diverging movement, comprising relatively movable parts capable when operated to retard diverging movement of said vehicle members, operating members for said retarding parts rotatably mounted upon the same axis, means for rendering said operating members ineffective to operate said retarding parts to produce a retarding effect in an intermediate zone, and yielding means normally tending to operate said members to cause said parts to produce a retarding effect.

15. A shock absorber adapted for connection to relatively movable body and axle members of a vehicle, comprising relatively movable brake drum and band parts associated for relative rotation without reduction of braking area throughout the full range of relative approach and separation of said members, two arms connected respectively to the opposite ends of said band and one thereof to one of said members for applying the brake when said members separate and relieving it when they approach, and wedge means lying between and effective upon said two arms for expanding the band to relieve the brake in both directions of relative rotation between said parts throughout a neutral zone, whereby the vehicle springs are unaffected on a smooth road under normal load.

In testimony whereof I hereby affix my signature.

JAMES S. REID.